(12) United States Patent
De Magalhães Gomes

(10) Patent No.: US 10,227,138 B2
(45) Date of Patent: Mar. 12, 2019

(54) ASYMMETRY-PROOF MULTI-ENGINE AIRCRAFT

(71) Applicant: Embraer S.A., São José dos Campos-SP (BR)

(72) Inventor: Ierko De Magalhães Gomes, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 23 days.

(21) Appl. No.: 15/061,425

(22) Filed: Mar. 4, 2016

(65) Prior Publication Data

US 2017/0253342 A1    Sep. 7, 2017

(51) Int. Cl.
| | |
|---|---|
| *B64D 31/10* | (2006.01) |
| *B64D 41/00* | (2006.01) |
| *B64D 45/00* | (2006.01) |
| *B64D 27/12* | (2006.01) |
| *B64D 27/24* | (2006.01) |
| *B64D 27/02* | (2006.01) |

(52) U.S. Cl.
CPC .............. *B64D 31/10* (2013.01); *B64D 27/12* (2013.01); *B64D 27/24* (2013.01); *B64D 41/00* (2013.01); *B64D 45/00* (2013.01); *B64D 2027/026* (2013.01); *B64D 2045/0085* (2013.01)

(58) Field of Classification Search
CPC ........ B64D 31/10; B64D 27/12; B64D 27/24; B64D 41/00; B64D 45/00
See application file for complete search history.

(56) References Cited

U.S. PATENT DOCUMENTS

| | | | | | |
|---|---|---|---|---|---|
| 3,012,740 | A | * | 12/1961 | Wagner ................. | B64C 23/005 244/208 |
| 3,146,972 | A | * | 9/1964 | Engel ..................... | B64D 17/78 244/76 R |
| 6,095,459 | A | * | 8/2000 | Codina .................... | B64C 9/32 244/213 |
| 6,126,111 | A | * | 10/2000 | Burcham, Jr. ......... | B64D 31/10 244/135 C |
| 8,340,840 | B2 | * | 12/2012 | Puig ........................ | B64C 13/18 244/76 C |
| 2014/0263854 | A1 | * | 9/2014 | Ross ................... | B64C 29/0033 244/7 A |
| 2015/0144742 | A1 | * | 5/2015 | Moxon .................. | B64D 27/12 244/215 |
| 2015/0197335 | A1 | | 7/2015 | Dekel et al. | |
| 2016/0200436 | A1 | * | 7/2016 | North .................. | B64C 29/0033 244/7 R |
| 2016/0229527 | A1 | * | 8/2016 | Duke .................... | B64C 23/065 |
| 2016/0244158 | A1 | * | 8/2016 | Fredericks ............. | B64C 25/52 |

(Continued)

*Primary Examiner* — Assres H Woldemaryam
(74) *Attorney, Agent, or Firm* — Nixon & Vanderhye P.C.

(57) ABSTRACT

An aircraft compensates for asymmetry of engine failure by drawing part of the energy produced by the still-operating engine to generate thrust at the tip of the opposite wing. For example, the left engine drives its own thrust on the left wing, but a portion of the energy the left engine produces is delivered at a propeller at the tip of right wing. Similarly, the right engine drives its own thrust on the right wing, but a portion of the energy the right engine produces is delivered at a propeller at the tip of the left wing. In this way, every pair of engines and opposite tip thrust generators are intrinsically balanced. In the event of one engine failure, no yaw moment will be noticed.

12 Claims, 3 Drawing Sheets

(56) References Cited

U.S. PATENT DOCUMENTS

2016/0304211 A1* 10/2016 Swann .................. B64D 31/06
2016/0332741 A1* 11/2016 Moxon .................. B64C 15/00
2016/0355272 A1* 12/2016 Moxon .................. B64D 35/04

* cited by examiner

US 10,227,138 B2

ASYMMETRY-PROOF MULTI-ENGINE AIRCRAFT

CROSS-REFERENCE TO RELATED APPLICATIONS

None.

STATEMENT REGARDING FEDERALLY SPONSORED RESEARCH OR DEVELOPMENT

None.

FIELD

Example non-limiting implementations herein relate to multi-engine aircrafts, typically airplanes and vertical and/or short take-off and landing (V/STOL) aircraft such as autogyros.

BACKGROUND

Multi-engine aircraft are designed to maintain flight qualities even when an engine fails. The failure of an engine produces an asymmetrical situation because one side or wing of the aircraft is propelled while the other side or wing of the aircraft is not propelled. This results in yaw, destabilizing the aircraft from a straightahead course.

Nowadays, most aircraft use rudders to compensate for thrust asymmetry. Most of those aircraft have rudder systems and vertical tails sized for this event of single engine failure.

In the case of V/STOL, there is no effective solution because at low speeds there is no rudder authority. Therefore, a different solution is needed to prevent the V/STOL aircraft from yawing upon engine failure.

BRIEF DESCRIPTION OF THE DRAWINGS

The following detailed description of exemplary non-limiting illustrative embodiments is to be read in conjunction with the drawings of which.

DETAILED DESCRIPTION OF EXAMPLE NON-LIMITING EMBODIMENTS

The example non-limiting embodiments herein comply with asymmetry of engine failure by drawing part of the energy produced by the side engine to generate thrust at or near the tip of the opposite wing. For example, the left engine drives its own thrust on the left wing, but a portion of the energy the left engine produces is delivered at a propeller at or near the tip of right wing. Similarly, the right engine drives its own thrust on the right wing, but a portion of the energy the right engine produces is delivered at a propeller at or near the tip of the left wing. In this way, every pair of engines and opposite tip thrust generators are intrinsically balanced. In the event of one engine failure, no yaw moment will be noticed.

This approach permits the rudder, the rudder system, and the vertical tail to be sized by other, less demanding conditions. Another advantage is to have a propeller at or near the tip of the wing, which reduces induced drag.

Figure 1:
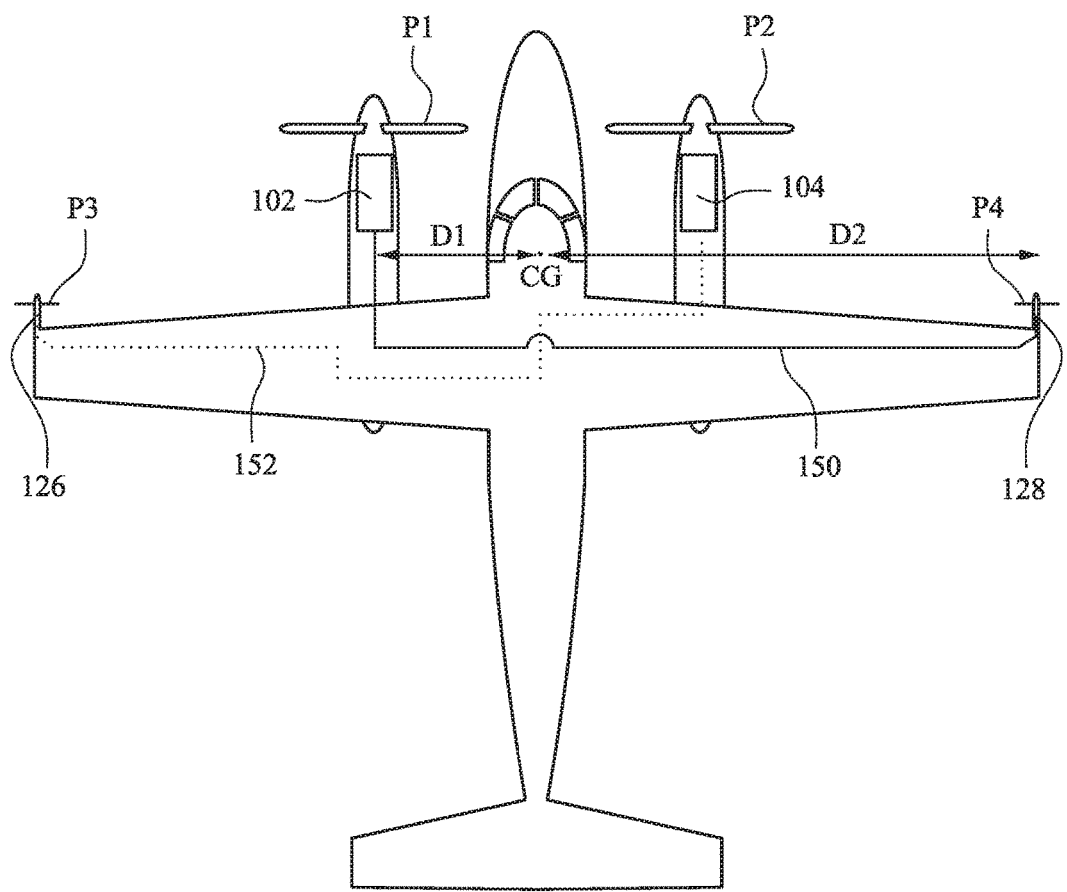
FIG. 1 shows an example non-limiting embodiment.

FIG. 1 shows, in one example embodiment, how part of the energy produced by a left combustion engine 102 is electrically delivered to an electric motor 128 and associated propeller P4 at or near the tip of right wing (solid line). In particular, item 150 is an electrical drive line that links engine 102/propeller P1 to wing tip motor 128/propeller P4. Item 150 thus functions like a mechanical shaft drive line that couples power from engine 102 to motor 128. Similarly, item 152 is another electrical drive line that links engine 104/propeller P2 to wing tip motor 126/propeller P3. Item 152 similarly also functions like a mechanical shaft drive line that couples power from engine 104 to motor 126. Thus, part of the engine thrust produced by a right combustion engine 104 is also electrically delivered for an electric motor 126 at the tip of the left wing (dotted line) to produce the same torque T that engine 102 produces through propeller P2.

When one main engine eventually fails, the thrust generated by the other main engine, electrically coupled to the electric engine at the end of the other side of the aircraft, prevents unbalancing the aircraft in the Z or yaw axis, preventing asymmetry. Meanwhile, the electric motor or engine at the wingtip brings benefits when it fights induced drag. Delivered thrust is enough to guarantee moment equilibrium. It is inversely proportional to the lever arm. (Thrust line to aircraft center of gravity or CG).

Figure 2:
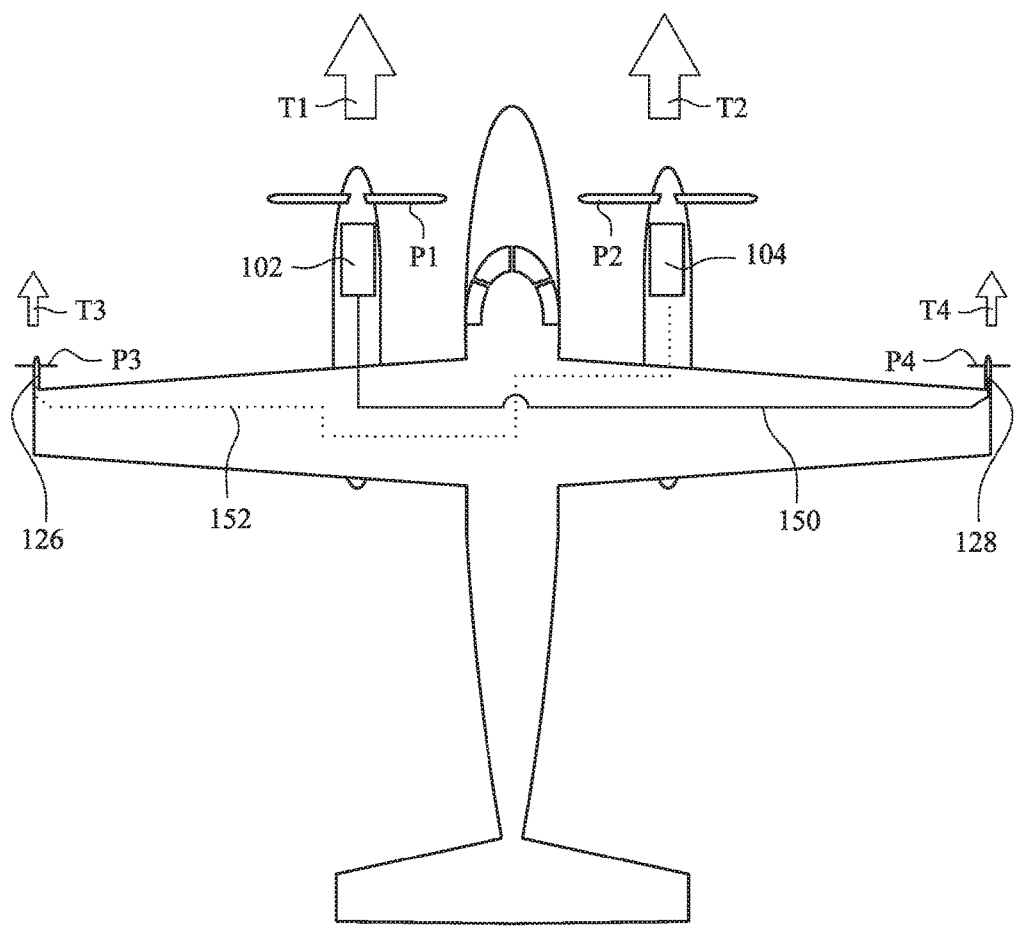
FIG. 2 shows the embodiment with all engines operative.

FIG. 2 shows the FIG. 1 embodiment with all engines operative. In this diagram, T1 is the propeller P1 thrust, T2 is the propeller T2 thrust, T3 is the propeller P3 thrust, and T4 is the propeller P4 thrust.

Figure 3:
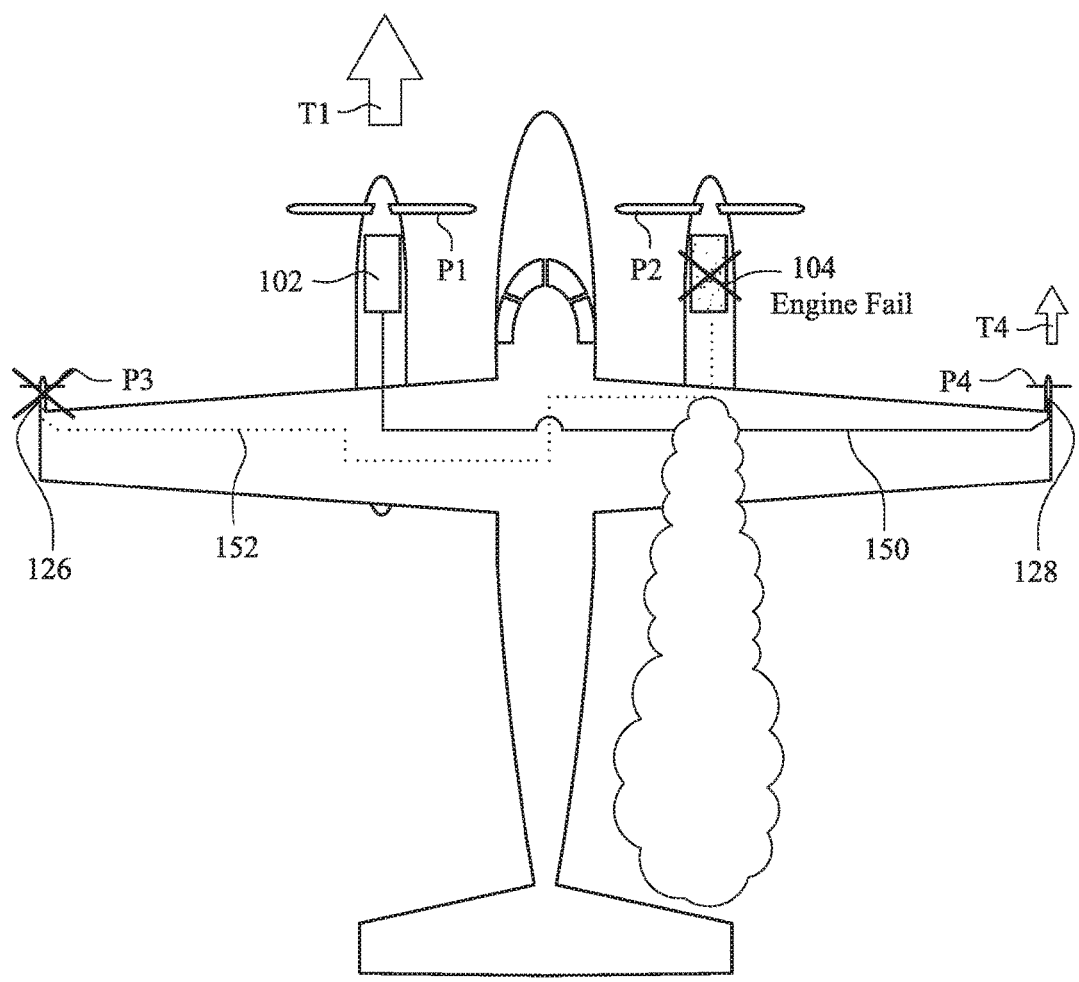
FIG. 3 shows the embodiment operating with an engine failure.

FIG. 3 shows what happens when engine 104 fails. Propeller P2 stops turning and thrust T2 becomes zero. Because energy to motor 126/propeller P3 comes from engine 104, motor 126/propeller P3 also stop by consequence. In the example embodiment, this failure configuration produces less overall forward thrust, but no asymmetry. Specifically, the remaining thrust T1 of propeller P1 and the thrust T4 of propeller P4 are maintained. Moreover, thrusts T1 and T4 are balanced by the lever difference from the respective thrust lines to the aircraft center of gravity to avoid rotation in the yaw direction. More specifically, the distance from propeller P4 to the aircraft's "center of gravity" and the magnitude of thrust T4 relative to the magnitude of thrust T1 are selected to provide a torque $\tau_{clockwise}$ in the clockwise yaw rotational direction that exactly balances the torque $\tau_{counterclockwise}$ that thrust T1 from engine 102/propeller P1 applies in the counterclockwise yaw rotational direction to rotate the aircraft about the aircraft's same "center of gravity". This means the thrust T1 from propeller P1 and the thrust T4 from propeller P4 balance to prevent the aircraft from rotating in the yaw direction.

More specifically, the aircraft has a center of gravity CG about which it rotates in the yaw direction based on the thrusts T1-T4 of the engines, the tail rudder, the ailerons, etc. Rotation about CG is important for navigation, e.g., to bring the aircraft to a new heading. However, during stable flight, the aircraft should follow a flight path straight ahead—not veer to the left or to the right. In the example embodiment, the electrical motors 126, 128 and associated propellers P3, P4 are sized and configured, taking into account their distances from the center of gravity, so that the torques T they apply exactly balance the internal combustion engines 102, 104 and associated propellers P1, P2 on the opposite sides of the aircraft. Because electrical motors 126, 128 and associated propellers P3, P4 are located at or near the wing tips, their distance from CG is much greater than the distance of the IC engines 102, 104 and propellers P1, P2 from CG. This allows much smaller motors 126, 128 and propellers P3, P4 to exert the same amount of balancing torque T even though the thrusts T3, T4 are less than the thrusts T1, T2, based on the common equation:

$$\tau = T*D$$

where $\tau$ is torque, F is the amount of thrust force applied, and D is the distance from the location at which the thrust (force) is exerted to the axis of yaw rotation about the center of gravity. In the preferred embodiment, motors 126, 128 are sized appropriately and propellers P3, P4 are sized and pitched appropriately so that:

$$T1*D1 = T3*D2$$

and $$T2*D1 = T4*D2,$$

where T1-T4 are thrusts, D1 is the distance from each of engines 102, 104 to CG, and D2 is the distance from each of engines 126, 128 to CG.

Other ways (e.g., hydraulic, mechanical linkage, etc.) are possible for coupling part of the thrust output from the combustion engines 102, 104 to the wing tip propellers P3, P4. Also, symmetrical control can be obtained by asymmetrical placement of the above components keeping sizing and configuration into account to satisfy the torque balancing equations above.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. Method for avoiding asymmetric propulsion of an aircraft including a first engine and a first wing tip propeller on a first side of the aircraft and a second engine and a second wing tip propeller on a second side of the aircraft, the method comprising: during normal operation of the first and second engines: (a) deriving drive power from the first engine and applying the derived drive power to the second wing tip propeller, and (b) deriving drive power from the second engine and applying the derived drive power to the first wing tip propeller, and when the first engine fails, continuing to derive drive power from the second engine and applying the derived drive power to the first a wing tip propeller positioned on the same side of the aircraft as the failed first engine without requiring reconfiguration in response to failure of the first engine.

2. The method of claim 1 wherein continuing to derive comprises continuing to derive electric power from the non-failed second engine and using the electric power to drive an electric motor and associated first wing tip propeller on the same side of the aircraft as the failed first engine.

3. The method of claim 1 wherein the second engine comprises a combustion engine.

4. The method of claim 1 further including driving the first and second wing tip propellers with electric motors.

5. The method of claim 1 wherein the first and second wing tip propellers are configured to produce a thrust.

6. The method of claim 1 wherein applying the derived drive power comprises generating a power in an amount that provides moment equilibrium that is inversely proportional to a lever arm related to a thrust line to an aircraft center of gravity.

7. Apparatus for avoiding asymmetric propulsion of an aircraft comprising first and second engines in the event of failure of the first engine, the first engine being disposed on a first side of the aircraft, the second engine being disposed on a second side of the aircraft different from the first side at a distance D2 from the aircraft center of gravity, the second engine producing a thrust T3, the apparatus comprising: an auxiliary engine or motor disposed at a wing tip on the first side of the aircraft and at a distance D1 from the aircraft center of gravity; and a power coupler coupled to the second engine that derives drive power from the second engine and delivers the derived drive power to the auxiliary engine or motor without requiring reconfiguration upon the first engine failing, the power coupler applying the derived drive power to the auxiliary engine or motor to thereby enable the auxiliary engine or motor to deliver a thrust T1 from at the wing tip and prevent the aircraft from yawing due to failure of the first engine, Wherein $T1*D1 = T3*D2$, wherein the power coupler is configured to derive electric power from the second engine and use the electric power to drive the auxiliary engine or motor and associated wine tip propeller on the same side of the aircraft as the failed engine.

8. The apparatus of claim 7 wherein the auxiliary engine or motor drives a wing tip propeller on the first side of the aircraft.

9. The apparatus of claim 7 wherein the first and second engines each comprise combustion engines.

10. The apparatus of claim 7 wherein the auxiliary engine or motor comprises an electric motor.

11. The apparatus of claim 7 wherein the auxiliary engine or motor produces power in an amount to provide moment equilibrium that is inversely proportional to a lever arm related to a thrust line to the aircraft center of gravity.

12. A cross-connected aircraft propulsion system for use with an aircraft having a left wing and a right wing, the aircraft propulsion system comprising: a left engine disposed on the left wing, the left engine generating electrical power; a left electric motor and associated propeller disposed on the tip of the left wing; a right engine disposed on the right wing, the right engine generating electrical power; a right electric motor and associated propeller disposed on the tip of the right wing; a first electrical connection that connects the left engine generated electrical power but not the right engine generated electrical power to the right electrical motor even during normal operation of the right engine; a second electrical connection connecting the right engine generated electrical power but not the left engine generated electrical power to the left electrical motor even during normal operation of the left engine; wherein no reconfiguration of the first or second electrical connections is required in response to failure of the left engine or right engine.

* * * * *